SUPERREGENERATIVE REMOTE CONTROL RECEIVER

Filed April 7, 1958 2 Sheets-Sheet 1

Inventor
Robert Adler
By Francis W. Crotty
Attorney

SUPERREGENERATIVE REMOTE CONTROL RECEIVER

Filed April 7, 1958 2 Sheets-Sheet 2

Inventor
Robert Adler
By Francis W. Crotty
Attorney

United States Patent Office 3,001,177

Patented Sept. 19, 1961

3,001,177
SUPERREGENERATIVE REMOTE CONTROL RECEIVER

Robert Adler, Northfield, Ill., assignor to Zenith Radio Corporation, a corporation of Delaware Filed Apr. 7, 1958, Ser. No. 726,689
6 Claims. (Cl. 340—171)

This invention relates to wave signal receivers for use in remote control systems of the type that respond only to desired signals and are insensitive to other signals which may be present at the remote location. In other words, the receivers to be described are especially suited for remote control systems that are to have enhanced freedom from false actuation, although they certainly may be advantageously employed in other installations where the requirements in respect of inadvertent actuation are not so severe.

Protection against false actuation is desirable for any remote control system in which a controlled or satellite station executes some function in response to a command that is radiated from a transmitting station; indeed, it is a necessary property if the system is to enjoy general application for the control of appliances and instruments located within the home, garage door openers, various and sundry industrial apparatus, and the like. While the adverse effects of interference and spurious signals may be largely obviated through the expedient of a cable extending from the control to the controlled station, the disadvantages of a cable connection far outweigh this freedom from interference and, as a consequence, systems featuring radiated commands have received much greater acceptance.

A number of proposals have been made for the purpose of obtaining freedom from false actuation in systems responding to radiated signals. One prior suggestion is disclosed in U.S. Letters Patent No. 2,817,025 issued December 17, 1957, to R. Adler and assigned to the same assignee as the present invention. That patent shows a system for remotely controlling a number of functions in a television receiver installed in a home, controlling such things as the on-off condition, channel selection and sound muting. It provides a comfortable margin of protection against false actuation by requiring that a command signal fall within a very narrow frequency range and have a predetermined minimum duration, as well, before the controlled device accepts and responds to it.

Another system, representing a different approach to the problem, is disclosed in a copending application, Serial No. 726,718, filed April 7, 1958, in the name of Alexander Ellett and likewise assigned to the same assignee as the present invention. The arrangement there disclosed achieves protection by requiring the receipt of a command comprised of two or more signals of different types of energy received in a particular time relation. For example, the receiver may require concurrent receipt of acoustical and electromagnetic signals before it executes a desired function.

The arrangements of the subject invention represent still further developments directed to protecting a controlled station from false operation. They employ superregenerative amplification and take advantage of certain unique properties of such amplifiers, considered alone and/or in conjunction with novel microphones of unusually high selectivity, to obtain freedom from false actuation with a minimum of apparatus while at the same time having a high sensitivity to radiated command signals.

Accordingly, it is an object of the invention to provide a novel wave signal receiver featuring the use of superregenerative amplification in a remote control system to be actuated only in response to a received signal of a particular frequency.

It is another object of the invention to provide a novel superregenerative type of wave signal receiver of inexpensive construction and especially suited for use in a remote control system.

A further and specific object of the invention is to provide a novel superregenerative amplifier having a high degree of selectivity and eminently useful for inclusion in a remote control system which is to respond only to the receipt of a signal of a particular frequency.

A wave signal receiver embodying the invention and exceedingly useful for a remote control system to be actuated only in response to a received signal of a given frequency comprises detector means including a superregenerative amplifier having a predetermined quench frequency. There is an input circuit for applying the received signal to the detector means and a control stage is coupled to the detector for developing a control effect in response to the application of the received signal to the detector. The input circuit, detector and control stage constitute the signal translating channel of the receiver and an electromechanical transducer is included in that channel for determining the selectivity of the receiver. The transducer includes a vibratory element having a frequency of mechanical resonance which has a predetermined relation to the frequency of the signal to which the receiver is to respond and means are coupled to the signal translating channel of the receiver for responding to the aforesaid control effect.

A particular feature of the invention takes advantage of the unusual characteristic of a superregenerative amplifier that an output signal is developed which, in the absence of a received signal, includes components having a frequency distribution representing noise but which, in the presence of a received unmodulated signal, includes no such noise components. The control stage responds to the interruption of the noise signal output to develop the control effect necessary to actuate the controlled device.

Another feature of the invention, pertaining to the construction of a highly selective superregenerative amplifier, concerns the use of an electromechanical transducer including a vibratory element, such as a magnetostrictive rod having a mechanical frequency corresponding to the desired signal frequency, in the grid circuit of the amplifier tube as a mechanism for converting a received acoustical signal into an electrical counterpart for amplification. The extraordinary "Q" or selectivity of such a transducer imparts a like selectivity to the amplifier.

The features of the present invention which are believed to be novel are set forth with particularity in the appended claims. The organization and manner of operation of the invention, together with further objects and advantages thereof, may best be understood by reference to the following description taken in connection with the accompanying drawings, in the several figures of which like reference numerals identify like elements, and in which:

FIGURE 1 is a block diagram of a superregenerative receiver constructed in accordance with the invention;

FIGURE 2 includes characteristic curves employed in explaining the operation of the receiver of FIGURE 1;

Figure 1:
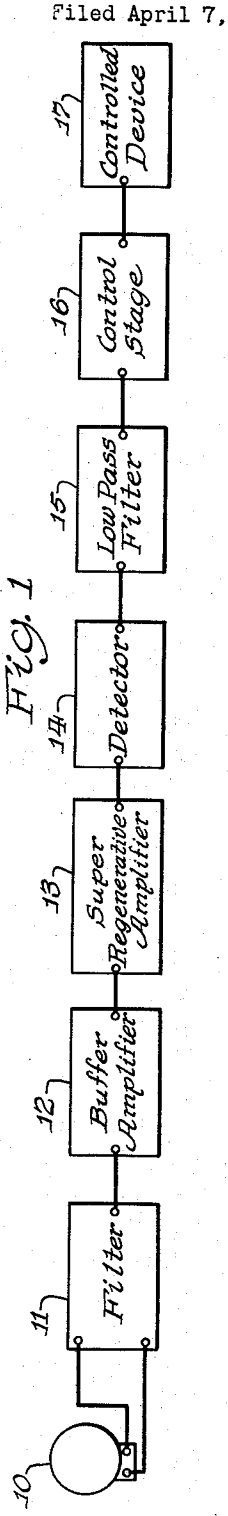

Before considering the receiver of FIGURE 1 in detail, it is appropriate to comment generally upon superregenerative receivers particularly as to their two well-recognized but different modes of operation. Essentially, such a receiver comprises a regenerative oscillatory circuit which is controlled by quenching to have alternately positive and negative values of conductance, the quenching being under the influence of an externally supplied signal or an internal effect within the receiver and occurring at a frequency low with reference to the operating frequency of the receiver. In order to achieve stable operating conditions, the control of the regenerative circuit by the quench signal is such that the circuit conductance, integrated over a period of time long with respect to the period of the quench signal, has a positive value. The receiver, depending upon its operation conditions and circuit parameters, may have a logarithmic or a linear mode of operation. In the logarithmic or saturation level mode, oscillations build up in each negative conductance interval to an equilibrium value before being quenched. In the linear mode, however, the oscillations in any quench cycle are not permitted to achieve equilibrium or saturation level before being quenched.

Thus, in both modes, transient oscillations are developed representing bursts of energy at the oscillatory frequency of the receiver and occurring at the quenching frequency. The amplitude of the exciting signal at the start of each negative conductance interval determines how quickly oscillations build up. In the logarithmic mode, the amplitude of the signal being amplified determines the portion of the negative conductance interval over which equilibrium conditions persist; in the special case of self-quenched operation, the signal amplitude may determine the quench frequency. In the linear mode, on the other hand, wherein quenching prevents the attainment of equilibrium conditions, the final amplitude of oscillation in each quench cycle manifests the amplitude of the applied signal at the start of that particular cycle. Accordingly, the transient oscillations of each mode reflect or manifest the amplitude variations of a received signal and permit the signal modulation to be recovered by detection. In the logarithmic mode, detection may be accomplished within the superregenerator itself or the oscillations may be supplied to a separate detector. For linear-mode operation, the oscillations are detected in a separate stage.

Mention should be made of one further characteristic of a logarithmic-mode superregenerator which is taken advantage of in the arrangement of FIGURE 1. In particular, that type receiver develops an output signal representing random noise in quench cycles occurring in the absence of a received signal. In the presence of an unmodulated received signal, however, where the received signal amplitude is large compared to the circuit noise level, the noise output signal of the detector falls to zero.

Considering the arrangement of FIGURE 1 now more particularly, the receiver there represented has an input circuit for applying a received signal to a detector including a superregenerative amplifier. This receiver may respond to a variety of forms of signal energy and may for example, be conveniently employed in a system in which the radiated command signals are acoustical or electromagnetic. For convenience and in order to describe a specific embodiment, it will be assumed that the system under consideration features the use of commands in the form of radiated acoustical energy. Accordingly, the input circuit comprises a sonic receiver or microphone 10 which may be of the electrostatic type and a filter 11 to which the output terminals of the microphone connect. The frequency characteristics of the filter may be relied upon to impose any desired degree of selectivity upon the microphone and the selectivity is chosen in accordance with the requirements of the particular installation.

Filter 11 is connected through a buffer amplifier 12 to detector means including a superregenerative amplifier 13 and a wave signal detector 14 which may be a crystal diode. The superregenerator is of conventional construction and may be supplied with a quenching signal from an external source or it may be of the self-quenching type. Coupled in cascade to detector 14 are a low-pass filter 15, a control stage 16, and a controlled device 17. Filter 15 has a cut-off frequency which is less than the quench frequency of superregenerator 13, and control stage 16 is arranged to develop a control effect upon interruption of the noise signal output received from detector 14 through filter 15. Structurally, stage 16 may constitute a grid leak detector and a relay connected into its anode circuit.

Figure 2:
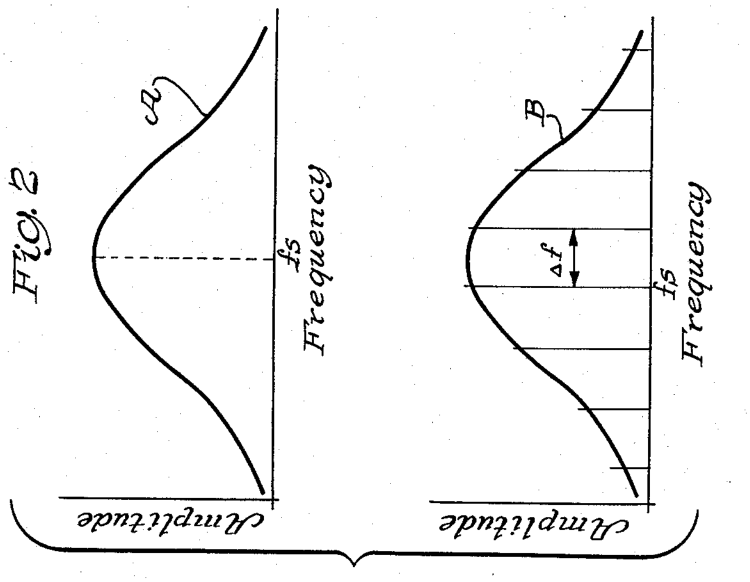

In considering the operation of this receiver, reference is made to the characteristic curves of FIGURE 2 wherein curve A represents the distribution of energy in the output signal of the superregenerator in the absence of a received unmodulated signal. The curve illustrates a random noise output, that is, an output including components having a frequency distribution representing noise. The ordinate $f_s$ represents the oscillatory frequency of the amplifier which, of course, is high relative to the quench frequency.

Actually, the energy is contained in bursts of transient oscillations occurring at the quench frequency and, after detection in detector 14, the noise frequency components are applied to low-pass filter 15. All such noise components within the pass band of the filter are translated to control stage 16, but that stage does not actuate controlled device 17 in response to this noise signal. Of course, the output of detector 14 will also include a strong component at the quench frequency but that component is not passed by filter 15.

When it is desired to actuate controlled device 17, a command signal is radiated from a controlling point to the receiver of FIGURE 1. Since the system has been assumed to be one employing acoustical or sonic energy, the transmitter may conveniently be of the type described in U.S. Letters Patent 2,821,954 issued February 4, 1958 to R. Adler and assigned to the same assignee as the present invention. Essentially, it is a longitudinal-mode vibrator, such as a steel rod, which issues an acoustical signal when struck at a free end. The physical length of the rod in relation to the velocity of wave propagation therein determines the frequency of the radiation which will, of course, be assumed to be within the acceptance band of microphone 10 and filter 11 at the receiver. The rod has relatively low internal damping so that the command is in the form of a pulse of substantial time duration. The response of the receiver to the command, in respect of quench cycles occurring within the duration of the signal, is similar to its response to a received unmodulated signal.

Curve B of FIGURE 2 indicates the energy distribution of the superregenerator 13 and detector 14 in the presence of the received signal. The ordinate line $f_s$ here corresponds to the frequency of the received signal which preferably is the same as the oscillatory frequency of the superregenerator but this is not a necessary condition. Satisfactory sensitivity is exhibited to signals which differ somewhat from the resonant frequency of the superregenerator.

The other vertical bars of FIGURE 2 represent the bunching or concentration of the energy of the superregenerator at points in the frequency spectrum which have a spacing $n\Delta f$ from the signal frequency $f_s$ equal to integral multiples of the quench frequency including the integer 1. This assumes that the amplitude of the received signal is large with respect to the inherent or internal noise which otherwise initiates oscillations within the superregenerator. The total energy in each quench cycle remains the same as in the absence of signal, but its distribution in the frequency spectrum is much different. Since the received command is an unmodulated signal, the output from detector 14 contains only the quench frequency $\Delta f$ and its harmonics and, as a consequence, no signal is passed through filter 15 to control stage 16. In other words, the noise signal applied to control stage 16 in quiescent operating conditions is interrupted and stage 16 responds to the interruption to develop a control effect which is applied to device 17 to cause it to perform a desired function. If stage 16 is a grid-leak detector, a control action is produced because such a detector experiences an increase in plate current when the signal applied to its grid is interrupted.

The invention is not particularly concerned with the nature of the controlled function executed by device 17. The controlled device may be a motor that is turned on or off; it may be a television receiver controlled as to on-off, channel selection, muting, volume; and such like.

The arrangement of FIGURE 1 is necessarily restricted to accomplishing a single control function for the simple reason that control stage 16 initiates the control upon interruption of the noise signal output of detector 14 and interruption of the noise signal is experienced upon the reception of any signal having a frequency within the acceptance band of the receiver. There is no other unique requirement as to frequency. Freedom from operation in response to spurious signals that may be present in the location of the receiver is determined by the selectivity imposed by microphone 10 and its filter 11 and is selected with regard to the environment in which the receiver is to be used. A very high degree of selectivity may result by employing a pick-up device or microphone in the form of an electromechanical transducer in place of units 10 and 11. In fact, such a transducer may so restrict the acceptance of the receiver that it responds only to a command signal of one frequency. Further consideration is given hereinafter to the structural features of such a microphone.

Figure 3:
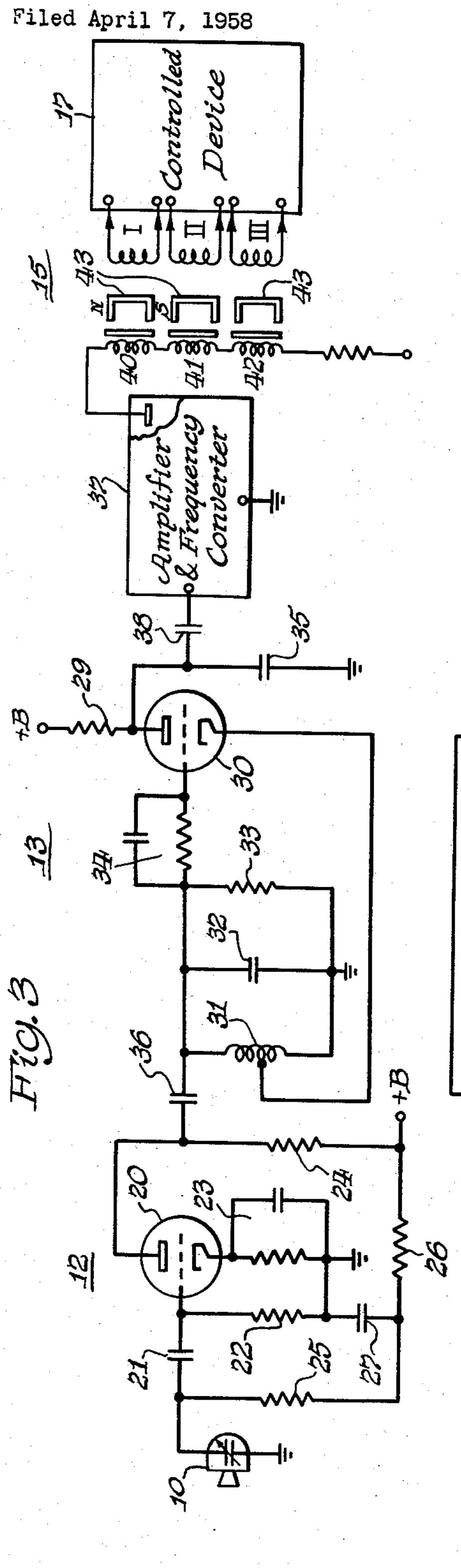
FIGURES 3 and 4 represent, partly schematically and partly in a block diagram, other superregenerative receivers embodying the teachings of the subject invention.

A modified form of receiver is represented in FIGURE 3. It distinguishes from the receiver of FIGURE 1 in that it has the ability to respond to a plurality of command signals and selectively accomplish any one of several control functions, distinguishing therebetween in accordance with some characteristic such as the frequency of the command that is received.

The receiver there represented comprises a broad-band electrostatic microphone 10 coupled to the input circuit of buffer amplifier 12 including a triode tube 20 having an anode, cathode, and control electrode. Microphone 10 is connected to the control electrode through a coupling condenser 21 and a grid resistor 22. An R-C type biasing network 23 connects the cathode of tube 20 to ground and the anode of the tube connects to a source +B of operating potential through a resistor 24. The high-potential terminal of microphone 10 is connected to source +B through series resistors 25, 26 and their common junction is grounded through a by-pass condenser 27.

The buffer amplifier connects to a self-quenching self-detecting logarithmic-mode superregenerator 13 including another triode tube 30. The associated circuitry connects this tube into an oscillatory circuit of the Hartley type, in which the operating frequency is determined by a resonant or tank circuit including an inductor 31, a condenser 32, and a resistor 33. Self-quenching action is under the control of self-biasing resistor-condenser network 34 connected in series with the control or grid electrode of tube 30. The anode of tube 30 connects to the source +B of operating potential through a resistor 29 and a condenser 35 provides a partial return for the A.C. anode current. A received signal may be applied to the supreregenerator from buffer amplifier 12 through a coupling condenser 36 and the detected output is delivered to an amplifier and frequency converter 37 through a coupling condenser 38. Unit 37 may be a single tube stage employing a multi-grid tube having a self-oscillatory section and a converter section. For example, it may be of the well-known pentagrid variety. Alternatively, it may have separate stages of amplification and frequency conversion, if desired. In order to effect frequency conversion, unit 37 must include a heterodyne oscillator if the conversion is to be a subtraction rather than division of frequency. The purpose of frequency conversion is to permit the use of radiated command signals of certain assigned frequencies to effect remote control through the agency of devices that are highly selective as to frequency and, preferably, respond to signals which are much lower in frequency than the command signals. These devices, of course, correspond in number to the number of command signals to be employed and have such frequency relation to the command signal frequencies that the simple process of heterodyning the detected output of the superregenerator derives signals for actuating them. If the system is intended to respond to three command signals, individually having an assigned frequency, the filter arrangement 15 may comprise three electromechanical transducers 40, 41 and 42 of the magnetostrictive type. Such a transducer includes a rod of magnetostrictive material, such as nickel, having a physical length adjusted to achieve a desired frequency of mechanical resonance. A permanent magnet 43 provides the necessary magnetic bias to the rod and a pair of coils is wound on spaced portions of each rod as a core. One coil of each pair is employed for excitation and the excitation coils are connected in series in the anode circuit of the output tube of amplifier and converter 37 as represented symbolically. The other coil of each pair is a pick-up coil into which a signal is induced by magnetostrictive conversion for application to controlled device 17 which, in this instance, has three control-input circuits. The pickup coil of each transducer is connected to one such input circuit.

The operation of the receiver of FIGURE 3 differs significantly from that of FIGURE 1 in that it is able to accommodate a plurality of command signals, distinguishing one from the other and directing the execution of controlled functions in accordance with the frequency of the command that happens to be received. It also is distinguishable from FIGURE 1 in that the control accomplished is in response to an amplified output signal from the detector rather than an interruption in its noise output. In operation, microphone 10 intercepts the command signal and applies it to superregenerative detector 13. A greatly amplified detected output signal of the same frequency as the received signal is applied to unit 37 for further amplification and for conversion in frequency to correspond to the mechanical resonant frequency of the particular one of transducers 40–42 to be controlled by the received command. The converted signal, in traversing the excitation coil of the transducer having a frequency of mechanical resonance equal to that of the applied signal, establishes a mechanical stress wave which traverses the magnetostrictive element and induces an output signal in the pick-up coil thereof. That signal is delivered to controlled device 17 which executes the function controlled by the input circuit to which the signal has been applied.

Buffer amplifier 12 isolates the superregenerator from microphone 10 as protection against the establishment of coherent oscillations which may otherwise be experienced if the superregenerator is permitted to actuate the microphone as a radiator, emitting radiations that may in turn be reflected back to the pick-up device and continue excitation of the detector. The amplifier of unit 37 performs a related function, isolating filters 40–42 from the superregenerator. Without such isolation, coherent oscillations may be established which would mask received signals and render the receiver effectively inoperative.

The system of FIGURE 3 accommodates a plurality of command signals to control a series of highly selective filters 40–42 and selective actuation of the filters is predicated upon the frequency separation of the command signals. The frequency separation of the command signals as a group should be less than the quench frequency so that, with reference to the energy distribution lines of FIGURE 2, they fall within the frequency spacing $\Delta f$. This assures appropriate frequency selection by the transducers without vertical interference. The heterodyning step provided by unit 37, as explained above, permits frequency-selective filters 40–42 to operate at lower frequencies than the received command signals in order that they may have lower values of "Q" and wider frequency separation. It is necessary, however, that the converter oscillator be stable and be arranged to avoid reaction upon the superregenerator. Simplification and some reduction in the number of circuit components required may result from the utilization of multigrid-multipurpose tubes which could, for example, provide, within the one envelope, the function of buffer amplifier 12 and the superregenerative detector. In any such combined stage, it is necessary that the buffer section be, in effect, isolated from the superregenerator section in order to safeguard against coherent oscillations. This may be accomplished by having the buffer and superregenerator sections act upon different and spaced portions of the electron stream with stray interelectrode coupling minimized.

Figure 4:
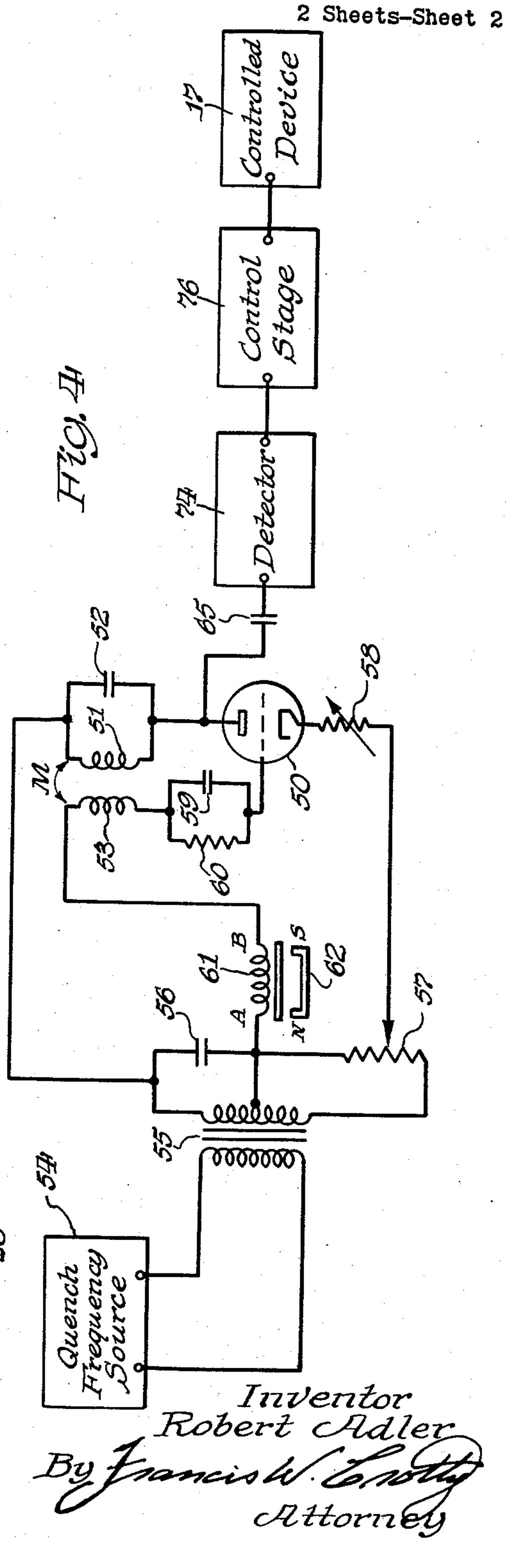

A linear-mode type of superregenerative amplifier of particular application to receiver apparatus for a remote control system intended to be actuated only in response to the reception of a signal of a particular frequency is shown in FIGURE 4. It includes an electron-discharge device 50 having an anode, a cathode and a control electrode, although it may be part of a multifunction, multigrid tube if desired. The circuitry associated with the tube for the purpose of constituting an oscillation generator comprises a resonant circuit formed of an inductor 51 and a condenser 52. This circuit is resonant at the desired operating frequency and is inductively coupled to a grid coil 53 as indicated symbolically at "M." The quench signal source 54, in this instance, is external to the amplifier and is the sole source of operating potential provided. It is coupled to the amplifier by means of a coupling transformer 55, across the secondary of which is connected a by-pass condenser 56 and a potentiometer 57. One terminal of the transformer secondary is connected to the anode of tube 50 through tank circuit 51, 52 and the other is connected through a tap of potentiometer 57 and an adjustable cathode resistor 58 to the cathode. The grid circuit of tube 50 includes, in addition to coil 53 and the usual grid condenser 59 and resistor 60, a coil 61 and is connected to the electrical center of the secondary winding of transformer 55.

The coil 61 is part of a very highly selective microphone constructed to respond only to a desired command frequency and used as a mechanism for converting a received acoustical signal into an electrical signal for amplification. Actually, it is an electromechanical transducer of the magnetostrictive type considered hereinabove and having a polarizing permanent magnet 62. The coil 61 is physically wound about a portion of the magnetostrictor to the end that the mechanical stress waves produced in the magnetostrictor by the impingement of received acoustical signals establish, through magnetostrictive conversion, an electrical signal in series in the grid circuit of the amplifier. The output signal of the amplifier is delivered through a coupling condenser 65 to a detector 74 which, in turn, supplies detected signals to a control stage 76 having an output circuit coupled to the control circuit of controlled device 17. Any of a variety of detectors, such as grid-leak or diode type, may be employed as unit 74 but the time constant should be long with respect to the quench period. The control stage in this embodiment is a threshold device which translates an applied signal provided that its amplitude exceeds a minimum value.

In operation, a command signal transmitted to the receiver in the form of acoustical radiation impinges upon the selective pick-up device 61, 62 and establishes a mechanical stress wave therein so long as the frequency of the sonic radiation is very close to the frequency of mechanical resonance of the magnetostrictor. The mechanical stress wave induces an electrical signal in coil 61 and this signal is applied to the amplifier. The amplifier, under the influence of the quench signal from source 54, experiences successive conditions of negative and positive conductance characteristics of superregeneration but the oscillations are not permitted to achieve saturation or equilibrium value in any quench cycle; in other words, the amplifier is controlled to operate in the linear mode. The presence of the received signal, assuming it to have an amplitude exceeding the noise level of the system, causes the amplitude of oscillations obtained in any quench cycle to be high with respect to that produced in the absence of the received signal. Accordingly, the output signal of detector 74 has substantially greater amplitude in the presence of signal. It will readily exceed the threshold amplitude of the associated control stage 76 and effect actuation of controlled device 17.

For this circuit to yield satisfactory performance, it is necessary that no oscillation current flow through the coil of the magnetostrictive microphone because, were that to occur, the low damping of the microphone would lead directly to a condition of continuous coherent oscillations. Any such condition would mask the reception of the received signal and disable the system. That is avoided in the described arrangements by the particular location of coil 61 in series in the grid circuit where no oscillator current flows. It is also necessary that the quench frequency be very low in order that ringing of the tank circuit 51, 52 upon termination of the received signal, may be permitted to decay down to the noise level. Otherwise, a single actuating signal would result in continuous coherent oscillations and destroy the system's sensitivity. This requirement may for instance, be satisfied if the quench signal is a 60 cycle signal obtained from a commercial power supply. This has the added benefit of eliminating the requirement for a separate quench signal source. A suitable frequency for the sonic energy is in the neighborhood of 40 kilocycles.

Figure 5:
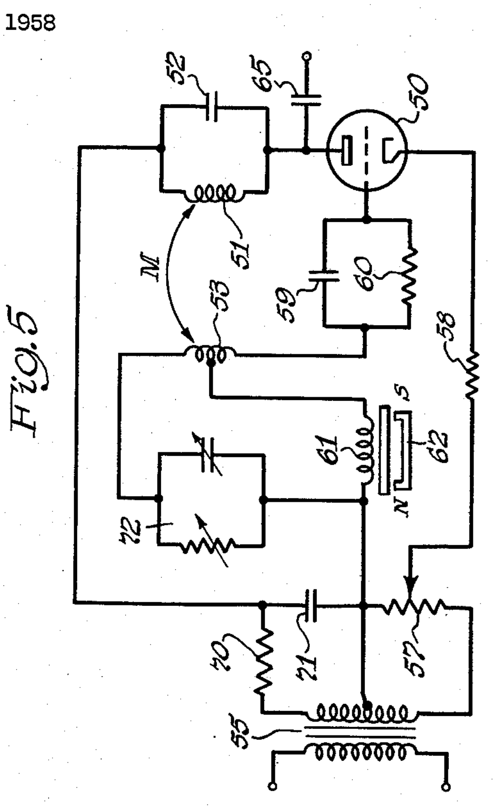
FIGURE 5 is a circuit diagram of a modified form of the superregenerative amplifier employed in arrangement of FIGURE 4.

It is further necessary, if linear mode operation is to be achieved, to maintain a closely controlled rate of amplitude build-up within the superregenerative amplifier. This is accomplished by the generous use of de-generative feedback resulting from cathode resistor 58. The dynamic transconductance of tube 50 is held to a very small fraction, in the order of one to five percent, of its normal transductance during the active part of the quench cycle to assure the necessary stability. Moreover, the low frequency of operation enhances the stability and permits operation without the isolation provided by a separate input buffer amplifier.

Where the quench signal from the external source is of sinusoidal waveform, the change from positive to negative conductance occurs as the quench signal crosses its A.C. axis. This is the portion of the waveform which has the greatest slope. The resulting transient tends to shock-excite tuned circuit 51, 52 at the instant plate current starts to flow. If this condition is permitted to prevail, the operation of the receiver is greatly impaired. Shock excitation may be eliminated by the modification of the amplifier represented in FIGURE 5. In this modification, a delay is introduced in the application of the quenching signal to the anode of tube 50 relative to the application of the quenching signal to the cathode. The delay is achieved by a network including a resistor 70 and a condenser 71. The arrangement of FIGURE 5 further includes neutralizing network in the grid circuit provided by an R-C network 72. This amplifier operates in precisely the same fashion as the amplifier of FIGURE 4 while, at the same time, avoiding the tendency to shock excitation resulting from transient effects as the circuit conductance changes from positive to negative. In the arrangement of FIGURE 5, the cathode potential of tube 50 becomes negative before the time delay network 70, 71 permits the anode to become positive. For this condition, a small amount of grid current is established, although not at the signal frequency because oscillations cannot commence until the anode potential is positive. Within a relatiavely few electrical degrees, the anode potential becomes positive and oscillations are permitted to be established.

In this circuit, as in the embodiment shown in FIGURE 4, the flow of electrons to the grid during the period of oscillation is prevented by cathode resistor 58 and by the high series resistance 60; the flow of capacitive current through coil 61 is neutralized by network 72.

Figure 6:
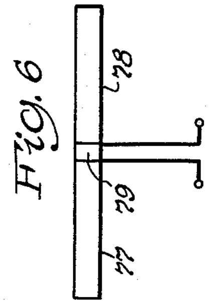
FIGURE 6 represents an electromechanical transducer which may be used in substitution for a different form of transducer employed in the arrangements of FIGURES 4 and 5.

A superregenerative receiver in the form of FIGURES 4 and 5 is a single-signal device and responds only to command signals at a frequency very close to the frequency of mechanical resonance of the magnetostrictive microphone. Other forms of highly selective microphone may be utilized, such as that represented in FIGURE 6, where the microphone is a two-part passive vibratory element 77, 78 with a centrally-positioned piezoelectric wafer 79. The passive elements 77, 78 may be sections of steel rod having a length selected in accordance with the velocity of wave signal propogation therein to achieve the desired mechanical resonance frequency. This device is a longitudinal-mode vibrator and the interposed wafer 79 is secured, by soldering, to the contiguous ends of vibrator sections 77, 78. The wafer is preferably constructed of a material having a high electromechanical coupling factor and may be formed of any of the titanate mixtures, especially barium titanate. Electrodes are provided on its opposed surfaces forming the interfaces with rod segments 77, 78 and leads extend from the electrodes to facilitate connecting the microphone in series with the grid circuit of the amplifier. Wafer 79, moreover, has a past history of polarizing such that it retains a remanent polarization in the longitudinal direction. This microphone lends itself to temperature compensation; the vibrator material and piezoelectric material may have compensating temperature coefficients so that the microphone is stable in the face of temperature changes. It is also possible to use rods or wafers of barium titanate in a piezoelectric microphone. Where such rods or wafers are employed, an electrical signal is derived through the agency of electrodes provided thereon.

The described structures all take advantage of the unique properties of superregenerative circuits, and, through utilization of the highly selective magnetostrictive or piezoelectric microphones, may be exceedingly selective. This affords substantial freedom against false actuation through a receiver construction that may be quite inexpensive. For example, units 12, 13 and 14 of FIGURE 1 may be provided by a single-tube circuit. Although tube circuits have been disclosed, the transistor equivalents are just as suitable for use as superregenerative amplifiers. Certain features described in this application are described and claimed in copending divisional application Serial No. 63,878 filed October 20, 1960 by Robert Adler for Superregenerative Remote Control Receiver and assigned to the same assignee as the present application.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. A wave signal receiver for a remote control system to be actuated only in response to a received signal of a given frequency, said receiver comprising: a superregenerative amplifier including an electron-discharge device having a cathode, a control electrode and at least one other electrode and further including associated circuitry constituting with said device an oscillatory circuit; a quench-signal source external to said amplifier for supplying a quench signal, having a frequency low with respect to the oscillatory frequency of said circuit, to effect conductance variations therein for the purpose of establishing superregenerative amplification of the linear-mode type; frequency-selective means, responsive substantially only to said received signal and connected in series with said control electrode in said oscillatory circuit, for applying said received signal to said amplifier; a control stage coupled to said amplifier for deriving a control effect in response to said received signal; and means coupled to said control stage for utilizing said control effect.

2. A wave signal receiver for a remote control system to be actuated only in response to a received acoustical signal of a given frequency, said receiver comprising: a superregenerative amplifier including an electron-discharge device having a cathode, a control electrode and at least one other electrode and further including associated circuitry constituting with said device an oscillatory circuit; a quench-signal source external to said amplifier for supplying a quench signal, having a frequency low with respect to the oscillatory frequency of said circuit, to effect conductance variations therein for the purpose of establishing superregenerative amplification of the linear-mode type; an electromechanical transducer, including a vibrator element having a frequency of mechanical resonance corresponding to said given frequency, connected in series with said control electrode in said oscillatory circuit for applying said received signal to said amplifier; a control stage coupled to said amplifier for deriving a control effect in response to said received signal; and means coupled to said control stage for utilizing said control effect.

3. A wave signal receiver for a remote control system to be actuated only in response to a received acoustical signal of a given frequency, said receiver comprising: a superregenerative amplifier including an electron-discharge device having a cathode, a control electrode and at least one other electrode and further including associated circuitry constituting with said device an oscillatory circuit characterized by the fact that no oscillator current flows in the circuit of said control electrode; a quench-signal source external to said amplifier for supplying a quench signal, having a frequency low with respect to the oscillatory frequency of said circuit, to effect conductance variations therein for the purpose of establishing superregenerative amplification of the linear-mode type; an electromechanical transducer, including a vibrator element having a frequency of mechanical resonance corresponding to said given frequency, connected in series with said control electrode in said oscillatory circuit for applying said received signal to said amplifier; a control stage coupled to said amplifier for deriving a control effect in response to said received signal; and means coupled to said control stage for utilizing said control effect.

4. A wave signal reeciver for a remote control system to be actuated only in response to a received acoustical signal of a given frequency, said receiver comprising: a superregenerative amplifier including an electron-discharge device having a cathode, a control electrode and at least one other electrode and further including associated circuitry constituting with said device an oscillatory circuit characterized by the fact that no oscillator current flows in the circuit of said control electrode, said associated circuitry including a cathode resistor providing degeneration such that during negative-conductance intervals of said amplifier the transconductance of said device is but a small fraction of its maximum value; a quench-signal source external to said amplifier for supplying a quench signal, having a frequency low with respect to the oscillatory frequency of said circuit, to effect conductance variations therein for the purpose of establishing superregenerative amplification of the linear-mode type; an electromechanical transducer, including a vibrator element having a frequency of mechanical resonance corresponding to said given frequency, connected in series with said control electrode in said oscillatory circuit for applying said received signal to said amplifier; a control stage coupled to said amplifier for deriving a control effect in response to said received signal; and means coupled to said control stage for utilizing said control effect.

5. A wave signal receiver for a remote control system to be actuated only in response to a received acoustical signal of a given frequency, said receiver comprising: a superregenerative amplifier including an electron-discharge device having a cathode, a control electrode and at least one other electrode and further including associated circuitry constituting with said device an oscillatory circuit characterized by the fact that no oscillator current flows in the circuit of said control electrode, said associated circuitry including a cathode resistor providing degeneration such that during negative-conductance intervals of said amplifier the transconductance of said device is but a small fraction of its maximum value; a quench-signal source external to said amplifier, constituting the sole source of excitation potential of said oscillatory circuit, and supplying between said cathode and other electrode of said device a quench signal, having a frequency low with respect to the oscillatory frequency of said circuit, to effect conductance variations therein for the purpose of establishing superregenerative amplification of the linear-mode type; an electromechanical transducer, including a vibrator element having a frequency of mechanical resonance corresponding to said given frequency, connected in series with said control electrode in said oscillatory circuit for applying said recived signal to said amplifier; a control stage coupled to said amplifier for deriving a control effect in response to said received signal; and means coupled to said control stage for utilizing said control effect.

6. A wave signal receiver for a remote control system to be actuated only in response to a received acoustical signal of a given frequency, said receiver comprising: a superregenerative amplifier including an electron-discharge device having a cathode, a control electrode and at least one other electrode and further including associated circuitry constituting with said device an oscillatory circuit characterized by the fact that no oscillator current flows in the circuit of said control electrode, said associated circuitry including a cathode resistor providing degeneration such that during negative-conductance intervals of said amplifier the transconductance of said device is but a small fraction of its maximum value; a quench-signal source external to said amplifier, constituting the sole source of excitation potential of said oscillatory circuit, for supplying a quench signal, having a frequency low with respect to the oscillatory frequency of said circuit, to effect conductance variations therein for the purpose of establishing a superregenerative amplification of the linear-mode type; means, including a time-delay device, for connecting said cathode and other electrode across said source and for delaying potential variations of said other electrode relative to related potential variations of said cathode; an electromechanical transducer, including a vibrator element having a frequency of mechanical resonance corresponding to said given frequency, connected in series with said control electrode in said oscillatory circuit for applying said received signal to said amplifier; a control stage coupled to said amplifier for deriving a control effect in response to said received signal; and means coupled to said control stage for utilizing said control effect.

References Cited in the file of this patent

UNITED STATES PATENTS

| | | |
|---|---|---|
| 2,138,894 | Ware | Dec. 6, 1938 |
| 2,363,651 | Crosby | Nov. 28, 1944 |
| 2,410,981 | Koch | Nov. 12, 1946 |
| 2,511,409 | Mayberry | June 13, 1950 |
| 2,584,132 | Kirkman | Feb. 5, 1952 |
| 2,625,650 | Spencer | Jan. 13, 1953 |
| 2,644,081 | Richman | June 30, 1953 |
| 2,739,273 | Andrews et al. | Mar. 20, 1956 |
| 2,800,104 | Cameron et al. | July 23, 1957 |

FOREIGN PATENTS

| | | |
|---|---|---|
| 667,188 | Great Britain | Feb. 27, 1952 |